Patented Dec. 12, 1933

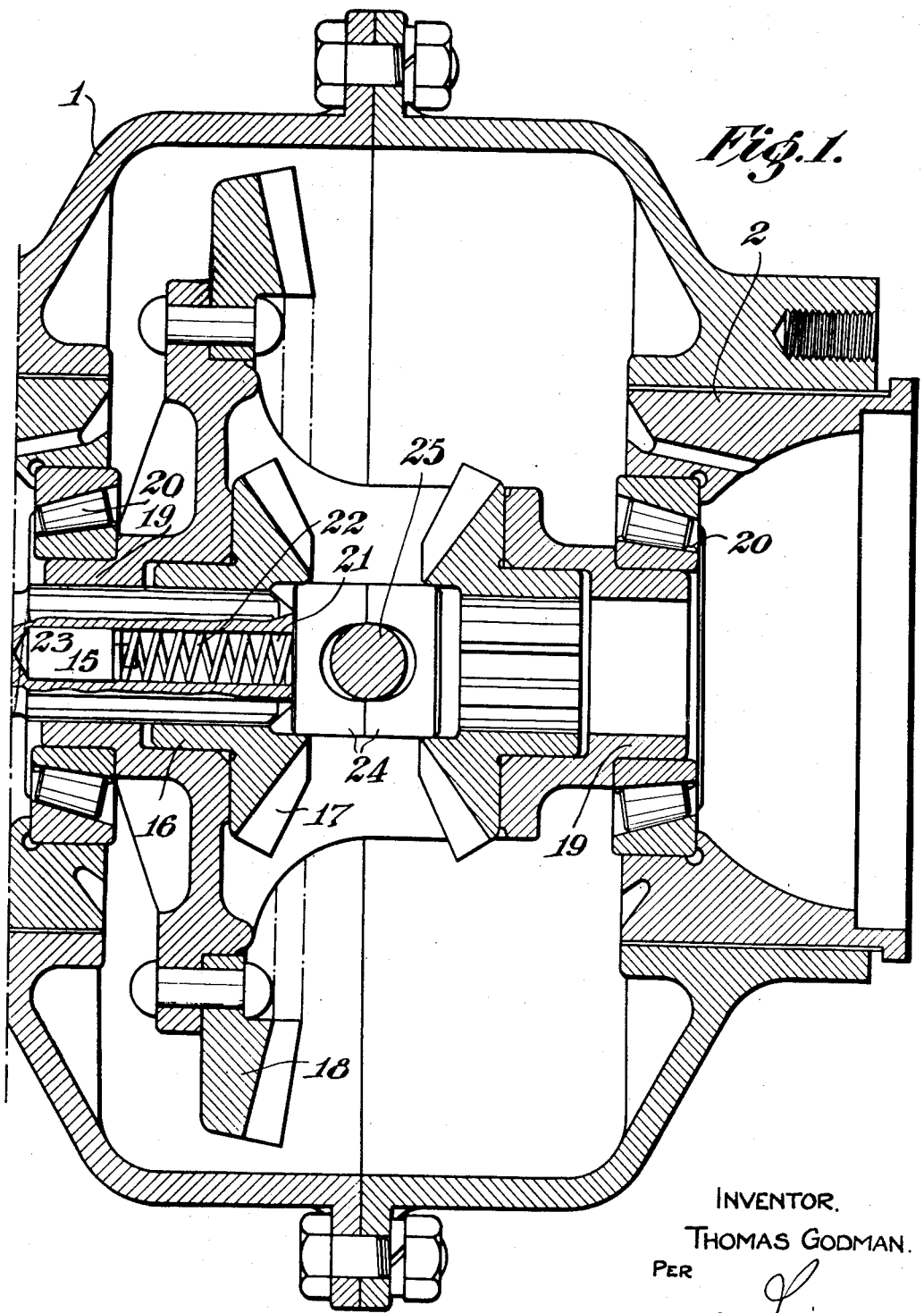

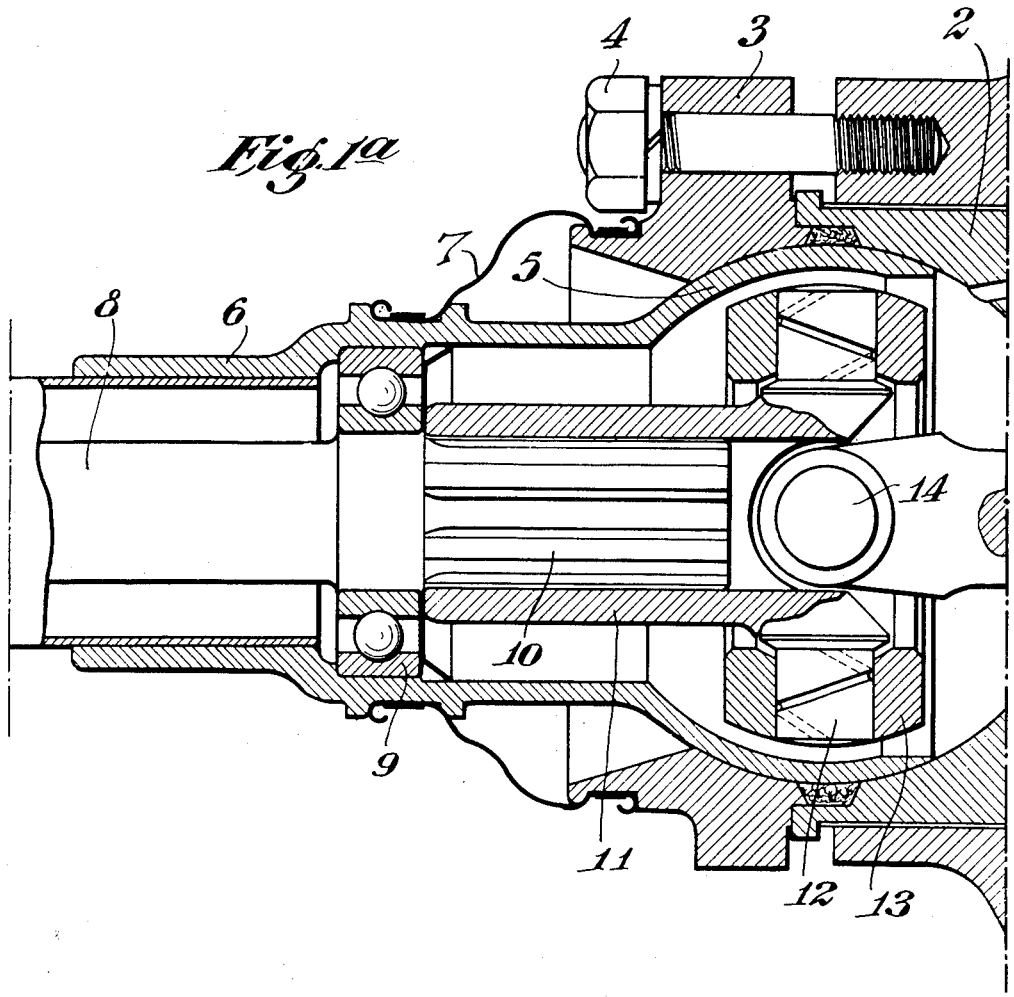

1,939,494

UNITED STATES PATENT OFFICE 1,939,494

DRIVE TRANSMISSION ARRANGEMENTS OF INDEPENDENTLY SPRUNG WHEELS OF ROAD VEHICLES

Thomas Godman, Stroud, England

Application October 18, 1932, Serial No. 638,325, and in Great Britain October 21, 1931

1 Claim. (Cl. 74—99)

This invention relates to drive transmission arrangements of independently sprung wheels of road vehicles, and has for its object to provide a practical construction of transmission mechanism which permits of the differential gear box being mounted rigidly on the vehicle chassis whilst the wheels driven thereby are free to rise and fall due to road inequalities, the mechanism of my invention being very compact and accessible and aiming at cheap production.

According to this invention, a universal joint is interposed in each drive from the differential sun pinions to the road wheels, each said universal joint being housed in a suitable casing or housing provided on the side of the differential casing. The axle shaft conveying the drive from the universal joint to the road wheel, is enclosed in a tubular casing having a part-spherical inner end fitting into a correspondingly shaped socket in the housing aforesaid so as to permit the necessary angular movements of the shaft, and the socket is divided to permit insertion and removal of the said sleeve. Also, provision is made for the uncoupling of the shaft in the locality of the universal joint to permit of expeditious assembling and dismantling.

One practical embodiment of my invention will now be described with reference to the accompanying drawings, in which the two views, Figs. 1 and Fig. 1a, are a longitudinal section through the differential gear and the drive mechanism on one side of said gear. The drive mechanism on the other side of the gear is identical and therefore is omitted from the drawings.

In the construction illustrated, the differential casing 1 is fitted at each side with a bushing 2 recessed in part-spherical fashion to form one half of a socket, the other half of which is constituted by a gland ring 3 having a step which enters an annular recess in the bush so as to retain interposed packing. The gland ring 3 is secured to the differential casing 1 by bolts 4. In the socket is mounted the part-spherical end 5 of the drive shaft casing 6, and a flexible apron 7 is secured to the said casing and to the gland ring 3 for grease retention and dust exclusion.

The inner end of the drive shaft 8 (hereinafter referred to as the secondary drive shaft) is mounted in a ball bearing 9 in the tubular casing, and has a splined extension 10 beyond said bearing, engaging the correspondingly splined sleeve 11 of one fork 12 of the universal joint. The arms of said fork are fulcrumed in a coupling ring 13 in which also are fulcrumed the arms 14 of another fork set at right angles to the fork 12 so as to form a universal joint. The said second fork 14 has a splined shaft 15 (hereinafter termed the primary drive shaft) engaged in the splined sleeve 16 of the differential sun pinion 17 which transmits the drive to that particular side of the vehicle. The crown wheel 18 has a hub portion 19 which encircles the primary drive shaft 15 but is freely rotatable therearound, said crown wheel hub being supported within the differential casing 1 by a tapered roller or other bearing 20 fitted in the bushing 2. The said primary drive shaft 15 is provided with a cavity 21 to receive a compression spring 22 which at one end bears against the base of said cavity or an interposed member 23, and at its other end against a thrust washer 24.

The hereinbefore described construction applies, of course, on each side of the differential gear, and the thrust washers 24, which are recessed to accommodate the transverse shaft 25 of the differential planet pinions, bear against one another, the compression springs 22 serving to maintain the universal joints in positions in which the points of intersection of the fork arms 12 and 14 are exactly in the centers of the respective sockets about which the part-spherical ends 5 of the tubular casings of the drive shafts have movement, so preventing any displacement due to the spline mounting of the forks.

I claim:—

A drive mechanism for independently suspended vehicle wheels comprising a differential gear housing, a pair of shaft casings each having a universal joint connection with said housing, a differential gear within said housing including sun pinions, primary drive shafts splined to said pinions, respectively, secondary drive shafts rotatably mounted in said casings, respectively, sleeves having splined connections with the inner ends of said secondary drive shaft, respectively, universal joint connections between the inner ends of said sleeves and the outer ends of said primary drive shafts, respectively, said last mentioned universal joint connections being disposed within said first named universal joint connections, respectively, planet gears in mesh with said sun pinions, a transverse shaft on which said planet gears are mounted, members bridging said last mentioned shaft, and springs between said members and said primary shafts, respectively, acting in opposition to each other to maintain said shaft connecting universal joints disposed substantially centrally with respect to said first named universal joints, respectively.

THOMAS GODMAN.